US006667012B1

(12) United States Patent
Anand et al.

(10) Patent No.: US 6,667,012 B1
(45) Date of Patent: Dec. 23, 2003

(54) CATALYTIC CONVERTER

(75) Inventors: Joginder N. Anand, Palatine, IL (US);
George P. Fotou, Champaign, IL (US);
Cheng-Hung Hung, Champaign, IL
(US); Joseph D. Smith, Tuscola, IL
(US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/534,935

(22) Filed: Mar. 24, 2000

Related U.S. Application Data

(60) Provisional application No. 60/126,532, filed on Mar. 26, 1999.

(51) Int. Cl.$^7$ ............................ B01D 53/94; B01J 35/00
(52) U.S. Cl. ........................ 422/177; 422/180; 423/212; 502/439; 502/527.14
(58) Field of Search ................................ 422/168–183; 423/212; 502/439, 527.14

(56) References Cited

U.S. PATENT DOCUMENTS

| | | | |
|---|---|---|---|
| 4,181,532 A | | 1/1980 | Woodhead |
| 4,382,323 A | * | 5/1983 | Chapman et al. ........... 422/180 |
| 4,388,277 A | | 6/1983 | Wright |
| 4,397,770 A | | 8/1983 | Cairns et al. |
| 4,515,758 A | | 5/1985 | Domesle et al. |
| 4,528,279 A | | 7/1985 | Suzuki et al. |
| 4,588,707 A | | 5/1986 | Domesle et al. |
| 5,015,615 A | | 5/1991 | Deller et al. |
| 5,024,985 A | | 6/1991 | Koberstein et al. |
| 5,079,064 A | | 1/1992 | Forsythe |
| 5,168,092 A | | 12/1992 | Forsythe |
| 5,370,920 A | | 12/1994 | Forsythe et al. |
| 5,629,067 A | * | 5/1997 | Kotani et al. ............... 428/116 |

FOREIGN PATENT DOCUMENTS

| | | |
|---|---|---|
| DE | 26 47 702 | 4/1977 |
| EP | 0 041 814 | 12/1981 |

OTHER PUBLICATIONS

Jacoby, "Getting Auto Exhausts To Pristine," *Chem. & Eng. News* (Jan. 25, 1999), pp. 36–44.
Goodboy et al., "Production Processes, Properties and Applications for Activated Catalytic Aluminas" in *Alumina Chemicals Science and Technology Handbook*, L.D. Hart, Ed. (The American Ceramic Society: 1990), pp. 93–98.
Misra, "Catalytic Aluminas" in *Industrial Alumina Chemicals* (American Chemical Society: 1986), pp. 133–149.
Johnston, "Surface Area" in *Journal of Catalysis*, vol. 123, pp. 245–259 (1990).

* cited by examiner

*Primary Examiner*—Hien Tran

(57) ABSTRACT

The present invention provides a catalytic converter for treating internal combustion engine exhaust comprising a substrate, fumed metal oxide aggregates adhered to the substrate, wherein no non-fumed metal oxide is present in the intra-aggregate voids, and at least one catalyst adhered to the fumed metal oxide aggregates. The present invention also provides a method of preparing such a catalytic converter, as well as a method of treating the exhaust of an internal combustion engine comprising contacting the exhaust of an internal combustion engine with a catalytic converter of the present invention.

38 Claims, 1 Drawing Sheet

US 6,667,012 B1

CATALYTIC CONVERTER

This application claims priority to U.S. Provisional Patent Application Ser. No. 60/126,532, filed on Mar. 26, 1999.

BACKGROUND OF THE INVENTION

1. Field of the Invention

The present invention relates to catalytic converters and methods for their use and preparation. More specifically, the present invention relates to improved catalytic converters which are useful in treating internal combustion engine exhaust.

2. Description of the Related Art

Catalytic converters are used in the exhaust system of automobiles to reduce the emission of pollutants such as hydrocarbons, carbon monoxide, nitrogen oxides and hydrogen sulfide. In a well tuned engine, incomplete combustion of gasoline tends to produce exhaust gas mixtures containing by volume 1 to 2% carbon monoxide, 500 to 1,000 parts per million (ppm) hydrocarbons, and up to a few thousand ppm nitrogen oxides. If allowed to pass untreated from a vehicle, hydrocarbons and nitrogen oxides mingle in the atmosphere, where photochemical reactions can convert them to smog. The other main component of exhaust pollution, carbon monoxide, is a deadly gas that can lead to asphyxiation or poisoning. Reduction in the emission of these compounds allows automobile operation with less strain on the environment and human health. Catalytic converters operate to reduce the emission of these compounds.

The most commonly used catalytic converter is a three-way converter that converts three harmful constituents of exhaust gas, namely carbon monoxide, nitrogen oxides, and hydrocarbons, to carbon dioxide, nitrogen gas, and water, respectively. The reaction is catalyzed by precious metal catalysts, which are supported on porous metal oxides.

The original metal oxide support was alumina ($Al_2O_3$). Recently, ceria ($CeO_2$) also has also been used because it has an oxygen storage capability that makes oxygen available for the oxidation of hydrocarbons and carbon monoxide under certain oxygen limiting conditions of engine use. Ceria is often stabilized by mixing it with zirconia ($ZrO_2$) to yield a homogenous mixed oxide.

Essentially, catalytic converters are composed of three parts—a ceramic or metallic substrate or monolith, a catalytic carrier or support, and a catalyst—generally surrounded by a housing, such as a steel container, which holds the converter. Typically, the catalyst in a converter is a precious metal such as platinum, palladium, rhodium, or a combination of these metals. Generally, these metals are dispersed on washcoats, which are coatings that cover the substrate and increase the catalytic surface area and provide catalyst binding sites. The active substances in washcoats typically are inorganic materials, most commonly metal oxides.

It is well known that modern catalytic converters deteriorate with use. This deterioration is caused, in large part, by a reduction in area of the catalytic surface that gradually occurs with time under the extremely high temperatures of use. To compensate for this deterioration, catalytic converters are manufactured to have an excess of catalyst coated surface. This insures that as the catalytic converter ages and deteriorates, sufficient levels of catalyst will remain catalytically available to reduce engine emissions to acceptable levels. Due to the high cost of the precious metal catalysts, this strategy dramatically increases the cost of manufacture of catalytic converters.

Surface area stabilizers have been incorporated into catalytic converters during manufacture to increase stability. This strategy, however, does not significantly obviate surface area deterioration.

Thus, new catalytic converters with improved surface area stability are needed in order to control manufacturing costs and meet increasingly more rigorous emission standards. The present invention provides such catalytic converters. These and other advantages of the present invention, as well as additional inventive features, will be apparent from the description of the invention provided herein.

BRIEF SUMMARY OF THE INVENTION

The present invention provides a catalytic converter for treating internal combustion engine exhaust comprising a substrate, fumed metal oxide aggregates adhered to the substrate, wherein no non-fumed metal oxide is present in the intra-aggregate voids, and at least one catalyst adhered to the fumed metal oxide aggregates. The present invention also provides a method of preparing such a catalytic converter, as well as a method of treating the exhaust of an internal combustion engine comprising contacting the exhaust of an internal combustion engine with a catalytic converter of the present invention.

The invention may best be understood with reference to the accompanying drawing and in the following detailed description of the invention.

DETAILED DESCRIPTION OF INVENTION

Figure 1:
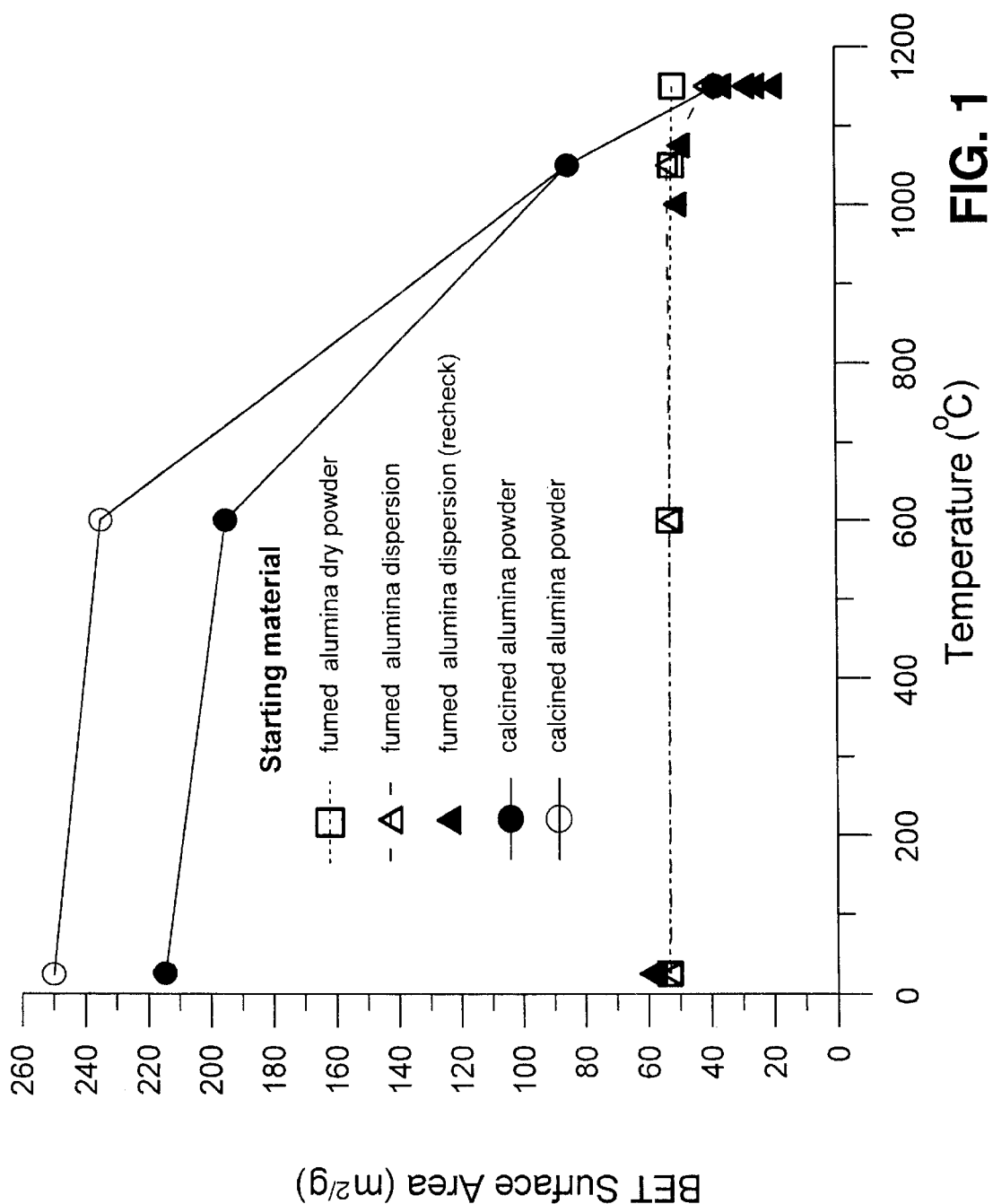
FIG. 1 is a graphical representation of a surface area-thermal stability test comparing fumed and non-fumed alumina. The tested alumina samples include fumed alumina dry powder ("□"), fumed alumina dispersion ("Δ"), a duplicate fumed alumina dispersion ("▼"), a commercially available calcined alumina powder (CATAPAL D™) ("●"), and another commercially available calcined alumina powder (CATAPAL A™) ("○"). The BET surface area ($m^2/g$) for each alumina sample is plotted as a function of temperature (° C.) at which the alumina samples were exposed.

Catalytic converters, their preparation, and their use are well known in the art. They are used to reduce harmful emissions from the exhaust of internal combustion engines.

Generally, catalytic converters are composed of three elements which are enclosed in a suitable housing, which is typically a steel housing. The three elements of a converter are the substrate or monolith, which usually is a honey-combed structure through which the exhaust gases pass, a coating (e.g., a washcoat formed by a coating agent) on the surface of the substrate which increases its surface area and which adheres the catalyst to the substrate, and the catalyst that accelerates the conversion of polluting exhaust gases into more benign compounds.

Any suitable substrate can be used in the context of the present invention. Suitable substrates desirably are capable of undergoing temperature changes of from below 0° C. to over 900° C. (such as 1050° C., 1075° C., 1150° C., or even 1200° C. or more) within minutes. Therefore, desirable substrates have a low coefficient of thermal expansion. In addition, substrates typically must be capable of withstanding constant vibration and must be durable enough to last for at least 100,000 miles [about 160,000 km], more preferably at least about 120,000 miles [about 190,000 km], or even more preferably at least about 150,000 miles [about 240,000 km] of automobile use according to government regulations.

Suitable substrates are known in the art. For example, one suitable substrate is the so called honeycomb carrier which has a number of pathways partitioned by thin walls. Due to the high porosity of these substrates, they are characterized by low resistance to the passage of exhaust gas. Substrates can be composed of various inorganic refractory materials, such as ceramic materials (e.g., cordierite, mullite, α-alumina, and silicon nitride) and heat resistant metals (e.g., steel, as well as steel alloys such as ferritic stainless steel containing nominally 20% chromium, 5% aluminum, and a minor amount of yttrium). Cordierite, a thermally rugged ceramic composed of magnesium oxide, silica, and alumina, is currently the most commonly used material. The honeycomb substrate typically is manufactured by extrusion methods that are well known in the art.

Suitable substrates are coated with a coating agent that forms a washcoat on the surface of the substrate. Generally, washcoats provide adherence sites for catalyst and increase the surface area of the catalytic surface. Methods for preparing washcoats are well known. See, for example, U.S. Pat. No. 4,528,279 (Suzuki et al.). Suitable methods generally involve preparing a dispersion of coating particles and treating the surface of the substrate with this dispersion so that the coating particles adhere to the substrate surface. The coated substrate is then dried.

Any suitable solvent can be used to prepare a dispersion of the coating agent of the present invention. Typically, a dispersion of the coating agent is prepared in an aqueous solvent. In some instances, a nonaqueous dispersion may provide a washcoat with superior characteristics, such as superior heat stability. In suitable washcoats, the rheology of the washcoat is controlled so that a uniform coating having a desirable thickness is deposited on the substrate. In some instances, an acid such as nitric acid is used to adjust the pH of the washcoat dispersion to control rheology.

In accordance with the present invention, the coating agent comprises, preferably consists of, fumed metal oxide particles. The fumed metal oxide particles typically are in the form of branched chain aggregates of primary particles. The fumed metal oxide can be any suitable fumed metal oxide. Preferably, the fumed metal oxide is selected from the group consisting of alumina, zirconia, ceria, yttria, silica, titania, baria, niobia, rubidia, strontia, calcia, and mixtures thereof More preferably, the fumed metal oxide is selected from the group consisting of alumina, zirconia, ceria, yttria, baria, and mixtures thereof. Most preferably, the fumed metal oxide is alumina. In some embodiments, the fumed metal oxide desirably is a mixture of alumina, zirconia, and ceria. In other embodiments, zirconia/ceria mixtures are desired. In yet other embodiments, alumina/silica mixtures are desired.

The preferred fumed metal oxide resists losing surface area when exposed to heat. For example, preferred fumed metal oxide aggregates lose about 50% or less (e.g., about 40% or less) surface area when heated to 1050° C. for 12 hours. More preferred are metal oxide aggregates that loose about 25% or less (e.g., about 15% or less) surface area when heated to 1050° C. for 12 hours. Even more preferred are metal oxide aggregates that loose about 10% or less (e.g., about 5% or less) surface area when heated to 1050° C. for 12 hours. Most preferably, the fumed metal oxide aggregates have the aforementioned surface area stability characteristics when heated to 1075° C., 1100° C., 1150° C., or most preferably 1200° C., for 12 hours. The surface area of the metal oxides can be measured by the nitrogen adsorption method of S. Brunauer, P. H. Emmet, and 1. Teller, *J. Am. Chem. Soc.*, 60, 309 (1938), which is commonly referred to as the BET technique.

Fumed metal oxides can be prepared from any suitable volatile or nonvolatile precursor. Fumed metal oxides can be produced from volatile precursors by hydrolysis and/or oxidation of the precursors (e.g., metal chloride) in a high temperature flame ($H_2$/air or $H_2$/$CH_4$/air) to produce the metal oxide of interest. Fumed metal oxides can be prepared from nonvolatile precursors by dissolving or dispersing the precursor in a suitable solvent such as water, alcohol, or acid-based solvent. The solution containing the precursor can be sprayed into a high temperature flame using a droplet generator, and the metal oxide aggregate then can be collected. Typical droplet generators include bi-fluid atomizers, high pressure spray nozzles, and ultrasonic atomizers.

One well documented method for producing fumed metal oxide involves the hydrolysis of a suitable feed stock vapor (such as aluminum chloride for fumed alumina, and silicon tetrachloride for fumed silica) in a flame of hydrogen and oxygen. Molten particles of roughly spherical shape are formed in the combustion process, the diameters of which are varied through process parameters (e.g., flame temperature). These molten spheres, typically referred to as primary particles, fuse with one another during collisions and form branched, three-dimensional, chain-like aggregates. This three-dimensional structure results in a material exhibiting a random geometry containing several pocketed areas, otherwise known as intra-aggregate voids. For the purposes of the present invention, the term intra-aggregate voids refers to all space in these pocketed areas that is not occupied by the primary particles in an aggregate.

For purposes of the present invention, no non-fumed metal oxide is present in these intra-aggregate voids. Non-fumed metal oxides include, for example, metal oxides prepared by methods such as precipitation, sol gel, and calcining processes. In some embodiments of the invention, the intra-aggregate voids contain no metal oxide at all. In other embodiments of the invention, no solid substance other than the catalyst, especially metal catalyst, is present in the intra-aggregate voids. Of course, in these embodiments, one of skill in the art can appreciate that allowance is made for the trace amounts of impurities present in suitable (e.g., commercially available) catalyst preparations.

The force necessary to break the aggregates is considerable and often considered irreversible because of the fusion. During cooling and collecting, the newly formed aggregates undergo further collisions that can result in some mechanical entanglements to form agglomerates. These agglomerates are thought to be loosely held together by van der Waals forces and can be reversed or deagglomerated by proper dispersion in a suitable media.

When aggregates form agglomerates or are deposited on a substrate, new void spaces are formed. These voids or spaces are called inter-aggregate voids. Thus, an inter-aggregate void is meant to refer to all additional void spaces created between the agglomerates and substrate coatings that is not occupied by the primary fumed metal oxide particles or the fumed metal oxide aggregates. In some embodiments of the invention, the inter-aggregate voids do not contain non-fumed metal oxides. In other embodiments, the inter-aggregate void contains no metal oxide at all. In yet other embodiments of the invention, no solid substance other than the catalyst, especially metal catalyst, is present in the inter-aggregate voids, allowing for the trace amounts of impurities in suitable (e.g., commercially available) catalyst preparations.

As indicated above, the fumed metal oxide consists of aggregates, each comprised of a large number of very small primary (generally spherical) particles (typically of 10–25 nm diameter) which are fairly uniform in size. The particle size distribution of the fumed metal oxide typically will be narrower than the particle size distribution of non-fumed metal oxides, e.g., metal oxides formed by way of liquid formation processes.

The size of the primary particles that comprise the metal oxide aggregates determine the surface area. Surface areas (BET values) for the fumed metal oxides typically are about 10–1000 $m^2/g$ (e.g., about 50–400 $m^2/g$), preferably about 20–200 $m^2/g$, and more preferably about 30–100 $m^2/g$.

While not wishing to be bound to any particular theory, it is believed that, as a result of being made in a flame (which is a high temperature environment), the fumed metal oxides have a more stable microstructure and are typically purer (as compared to, for example, non-fumed metal oxides prepared by certain alternative methods such as wet chemistry processes), thereby resulting in a far superior support for a catalytic converter.

In addition, the fumed metal oxides produced by the disclosed methods generally have minimal contamination (in many cases, less than 100 ppm impurities). Typically, no additional purification of the fumed metal oxide is required prior to use in the context of the present invention.

Preferably, the fumed metal oxide is pure and is applied to the substrate in pure form. In some instances, however, advantages are achieved when the fumed metal oxide is doped with certain compounds. For example, the present invention contemplates the use of metal oxides, such as $SiO_2$, $TiO_2$, $ZrO_2$, $La_2O_3$, CaO, BaO, $Fe_2O_3$, and others, which are known to stabilize certain metal oxides such as alumina and/or to desirably modify the effect of the catalyst, especially catalytically active platinum group elements. Such dopants can be used according to established methods in the art.

A washcoat can be prepared by treating (e.g., coating) a substrate with one or more metal oxides (at least one of which is a fumed metal oxide) simultaneously (e.g., from a single dispersion) or sequentially (e.g., from two or more dispersions). Thus, certain methods contemplated for preparing a washcoat include treating a substrate with a dispersion of fumed alumina, or with a dispersion of a mixture of fumed zirconia and ceria. In other methods, a washcoat is generated by treating a substrate with a dispersion of fumed alumina followed by treatment with a dispersion of a mixture of zirconia and/or ceria. Another method involves treating a substrate with a dispersion of a mixture of fumed alumina along with ceria and/or zirconia. In yet another method, one region of a substrate is treated with an alumina dispersion and a distinct region or discrete substrate is treated with a dispersion of a mixture of ceria and/or zirconia.

Any suitable catalyst can be used in the catalytic converter. Typically, catalysts include the noble or precious metals. Preferably, the catalyst is selected from the group of metals consisting of platinum, rhodium, palladium, and mixtures thereof. Even more preferably, the catalyst is palladium. Catalyst mixtures can also be used. Certain embodiments include catalyst mixtures containing mostly palladium with small amounts of platinum and/or rhodium. For example, the mixtures can consist of about 70–90% (e.g., about 80%) palladium and about 10–30% (e.g., about 20%) of platinum and/or rhodium.

Catalyst can be laid down on the substrate and adhered to the coating by any suitable method. Several suitable methods are well known in the art. For example, at least one catalyst can be laid down on the substrate with the fumed metal oxide (e.g., by inclusion in the aforementioned metal oxide dispersions to form the washcoat).

Alternatively, at least one catalyst can be laid down after the deposition of the fumed metal oxide on the substrate (e.g., after the washcoat is generated). Typically, the catalyst is laid down on the substrate coating (e.g., washcoat) after the coating is formed on the substrate.

The catalyst can be directly coated or formed in situ on the substrate coating.

For example, U.S. Pat. No. 4,528,279 discloses, among other methods, contacting a washcoat with aqueous halogenated catalyst solutions (e.g., palladium chloride), followed by a drying procedure and reduction with hot nitrogen gas.

Thus, in some embodiments, a catalyst or catalyst precursor is included in the dispersions of fumed alumina, a mixture of fumed ceria and zirconia, or with a mixture of fumed alumina with ceria and/or zirconia, which is then used to form the substrate coating (e.g., washcoat). In other embodiments, a catalyst or catalyst precursor is included in a first dispersion of fumed alumina which is used to form a coating on a substrate (e.g., washcoat), and the resulting coated substrate is treated with a second dispersion comprising zirconia and/or ceria, optionally with additional catalyst or catalyst precursor.

Any suitable method of preparing the present inventive catalytic converter can be employed. Typically, the preparation method comprises obtaining a substrate, adhering a fumed metal oxide aggregate to the substrate to form a coated substrate, and adhering at least one catalyst to the coated substrate.

A method of treating exhaust of an internal combustion engine is also contemplated by the present invention. The method comprises contacting exhaust of an internal combustion engine with a catalytic converter of the present invention.

The following examples further illustrate the present invention and, of course, should not be construed as in any way limiting its scope.

EXAMPLE 1

This example illustrates the surface area-thermal stability of fumed metal oxides in the context of the present invention.

Three fumed alumina samples were thermally treated in a furnace at 1050° C. for 5 hours in still air according to a standard procedure employed by automotive catalyst manufacturers. The surface area (BET technique) was determined for each of the samples, both before and after the thermal treatment, and the percent decrease in surface area was calculated for each sample. The resulting data is set forth in Table 1.

TABLE 1

Surface Area-Thermal Stability of Fumed Alumina

| Metal Oxide | Original Surface Area (m²/g) | Surface Area After Thermal Treatment (m²/g) | Decrease In Surface Area |
|---|---|---|---|
| Fumed Alumina | 58 | 55 | 5% |
| Fumed Alumina | 95 | 89 | 6% |
| Fumed Alumina | 137 | 91 | 34% |

The foregoing data in Table 1 reveals a remarkable surface area-thermal stability for fumed alumina, especially for the fumed alumina of low and intermediate surface area.

EXAMPLE 2

This example illustrates the surface area-thermal stability of fumed alumina as compared to non-fumed alumina.

The surface area (BET technique) of various alumina compositions was measured after heat treatment at various temperatures up to 1150° C. for 12 hours in a furnace purged with air. The evaluated alumina compositions consisted of fumed alumina dry powder, fumed alumina dispersion, and fumed alumina dispersion (recheck). In addition, surface area data was obtained from the published literature for two commercially available calcined alumina preparations known as CATAPAL A™ and CATAPAL D™ (Condea Vista Company, Houston, Tex.).

The results of this evaluation of the fumed alumina preparations, as well as the published literature data for the calcined alumina preparations, are plotted in FIG. 1. As is apparent from FIG. 1, the surface area of the fumed alumina preparations is substantially unchanged from about 25° C. up to about 1075° C., while the surface area of the conventional calcined alumina preparations significantly decreased from about 25° C. to about 1075° C., specifically losing about 60–65% surface area over that temperature range. In addition, in the temperature range from about 25° C. to about 1150° C., the surface area of the fumed alumina preparations decreased about 3–65%, while the surface area of the conventional calcined alumina preparations decreased about 80–85%. These results demonstrate the remarkable surface area-thermal stability of fumed alumina preparations as compared to conventional calcined alumina preparations.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A catalytic converter for treating internal combustion engine exhaust comprising (a) a substrate, (b) fumed-metal particles adhered to said substrate, wherein said fumed metal oxide particles are fumed metal oxide aggregates of primary particles having intra-aggregate voids therebetween, wherein no non-fumed metal oxide is present in the intra-aggregate voids, and wherein inter-aggregate voids exist between the fumed metal oxide aggregates, and (c) at least one catalyst adhered to said fumed metal oxide aggregates.

2. The catalytic converter of claim 1, wherein no non-fumed metal oxide is present in the inter-aggregate voids.

3. The catalytic converter of claim 1, wherein no metal oxide is present in the intra-aggregate voids.

4. The catalytic converter of claim 3 wherein no metal oxide is present in the inter-aggregate voids.

5. The catalytic converter of claim 1, wherein no solid substance other than said catalyst is present in the intra-aggregate voids.

6. The catalytic converter of claim 5, wherein no solid substance other than said catalyst is present in the inter-aggregate voids.

7. The catalytic converter of claim 1, wherein said substrate is a ceramic substrate.

8. The catalytic converter of claim 1, wherein said substrate is a metallic substrate.

9. The catalytic converter of claim 1, wherein said fumed metal oxide is selected form the group consisting of alumina, zirconia, ceria, yttria, silica, titania, baria, niobia, rubidia, strontia, calcia and mixtures thereof.

10. The catalytic converter of claim 9, wherein said fumed metal oxide is selected from the group consisting of alumina, zirconia, ceria, yttria, baria, and mixtures thereof.

11. The catalytic converter of claim 10, wherein said fumed metal oxide is alumina.

12. The catalytic converter of claim 10, wherein said fumed metal oxide is a mixture of alumina, zirconia, and ceria.

13. The catalytic converter of claim 1, wherein said catalyst is a precious metal.

14. The catalytic converter of claim 13, wherein said precious metal catalyst is selected from the group consisting of platinum, rhodium, palladium, and mixtures thereof.

15. The catalytic converter of claim 14, wherein said catalyst is palladium.

16. The catalytic converter of claim 1, wherein said fumed metal oxide aggregates have a surface area that decreases by about 50% or less when heated to 1075° C. for 12 hours.

17. The catalytic converter of claim 16, wherein said metal oxide aggregates have a surface area that decreases by about 25% or less when heated to 1075° C. for 12 hours.

18. The catalytic converter of claim 17, wherein said metal oxide aggregates have a surface area that decreases by about 10% or less when heated to 1075° C. for 12 hours.

19. In an improved catalytic converter for treating internal combustion engine exhaust comprising a substrate, metal oxide particles adhered to the substrate, and at least one catalyst adhered to the metal oxide particles, the improvement comprising the metal oxide particles being fumed metal oxide aggregates of primary particles having intra-aggregate voids therebetween which do not contain any metal oxide other than a fumed metal oxide.

20. A method of treating exhaust of an internal combustion engine comprising contacting exhaust of an internal combustion engine claim 1.

21. A method of preparing a catalytic converter comprising (a) obtaining a substrate, (b) adhering fumed metal oxide particles to said substrate to form a coated substrate, wherein said fumed metal oxide particles are fumed metal oxide aggregates of primary articles having intra-aggregate voids therebetween, and wherein no non-fumed metal oxide is present in the intra-aggregate voids, and wherein inter-aggregate voids exist between the fumed metal oxide aggregates, and (c) adhering at least one catalyst to said coated substrate.

22. The method of preparing a catalytic converter of claim 21, wherein no non-fumed metal oxide is present in the inter-aggregate voids.

23. The method of preparing a catalytic converter of claim 21, wherein no metal oxide is present in the intra-aggregate voids.

24. The method of preparing a catalytic converter of claim 23, wherein no metal oxide is present in the inter-aggregate voids.

25. The method of preparing a catalytic converter of claim 21, wherein no solid substance other than said catalyst is present in the intra-aggregate voids.

26. The method of preparing a catalytic converter of claim 25, wherein no solid substance other than said catalyst is present in the inter-aggregate voids.

27. The method of preparing a catalytic converter of claim 21, wherein said substrate is a ceramic substrate.

28. The method of preparing a catalytic converter of claim 21, wherein said substrate is a metallic substrate.

29. The method of preparing a catalytic converter of claim 21, wherein said fumed metal oxide is selected form the group consisting of alumina, zirconia, ceria, yttria, silica, titania, baria, niobia, rubidia, strontia, calcia and mixtures thereof.

30. The method of preparing a catalytic converter of claim 29, wherein said fumed metal oxide is selected from the group consisting of alumina, zirconia, ceria, yttria, baria, and mixtures thereof.

31. The method of preparing a catalytic converter of claim 30, wherein said fumed metal oxide is alumina.

32. The method of preparing a catalytic converter of claim 30, wherein said finned metal oxide is a mixture of alumina, zirconia, and ceria.

33. The method of preparing a catalytic converter of claim 21, wherein said catalyst is a precious metal.

34. The method of preparing a catalytic converter of claim 33, wherein said precious metal catalyst is selected from the group consisting of platinum, rhodium, palladium, and mixtures thereof.

35. The method of preparing a catalytic converter of claim 34, wherein said catalyst is palladium.

36. The method of preparing a catalytic converter of claim 21, wherein said fumed metal oxide aggregates have a surface area that decreases by about 50% or less when heated to 1075° C. for 12 hours.

37. The method of preparing a catalytic converter of claim 36, wherein said metal oxide aggregates have a surface area that decreases by about 25% or less when heated to 1075° C. for 12 hours.

38. The method of preparing a catalytic converter of claim 37, wherein said metal oxide aggregates have a surface area that decreases by about 10% or less when heated to 1075° C. for 12 hours.

* * * * *